April 8, 1924.

P. COVIN 1,489,235

MOUSE AND RAT TRAP

Filed Feb. 9, 1922

INVENTOR.
Peter Covin.
BY George C. Heinicke
ATTORNEY.

Patented Apr. 8, 1924.

1,489,235

UNITED STATES PATENT OFFICE.

PETER COVIN, OF PITTSBURGH, PENNSYLVANIA.

MOUSE AND RAT TRAP.

Application filed February 9, 1922. Serial No. 535,252.

*To all whom it may concern:*

Be it known that I, PETER COVIN, a citizen of Russia, residing at Pittsburgh, county of Allegheny, and State of Pennsylvania, have invented certain new and useful Improvements in Mouse and Rat Traps, of which the following is a specification.

This invention relates to improvements in mouse and rat traps and it is the principal object of the invention to provide a trap which sets itself after each operation.

Another object of the invention is to provide a trap of this character in which a tilting platform is used to drop the animal at one end of the same into a fluid containing chamber while the opposite end of said platform operates to set the trap for a new catch.

These and other like objects are attained by the novel construction and combination of parts hereinafter described and shown in the accompanying drawing, forming a material part of this disclosure, and in which.

Figure 1:
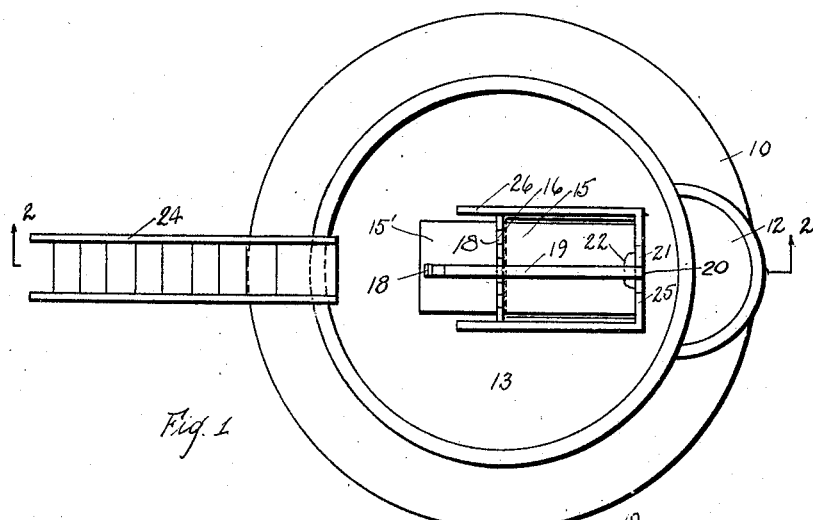
Figure 1 is a top plan view of a trap constructed according to the present invention.
Figure 2:
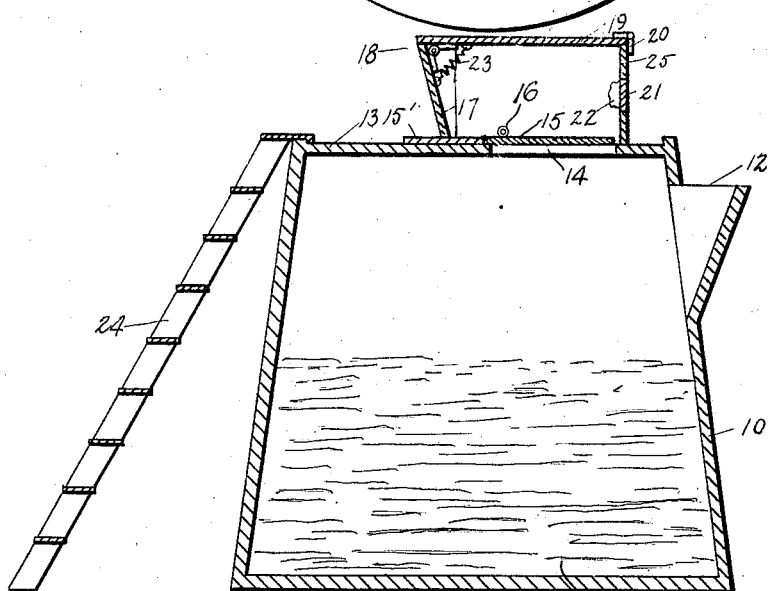
Figure 2 is a vertical section through the trap on line 2—2 of Figure 1.

The trap comprises a casing 10 adapted to be partly filled with a fluid, as for instance water indicated at 11, and provided at its upper part with a filler or discharge opening 12 for the fluid. The cover 13 of the casing has an opening 14 over which one part of a tilting platform 15 is arranged and the opening is of a width allowing a free up and down movement of the part of platform 15 above said opening.

The platform 15 tilts around a pin 16 and its part 15' rests on cover 13 and supports the lower end of a post 17 hinged at its upper part as at 18 to a bar 19 hinged as at 20 to the wall 21 of a housing 26 on top of casing 10 on cover 13 which carries the bait or lure 22. The post 17 and the bar 19 are connected by a spring 23 secured at its ends to said bar and said post near their meeting edges, while a ladder 24 facilitates the access to the bait.

In order to prevent a rodent from snatching the bait from the rear by jumping on top of the cover, a wire netting or the like 25 covers the bait at the rear, while the housing 26 protects the bait and compels the animal to step upon the platform to reach the bait, which then will tilt and throw the animal into the fluid container 10. The housing 26 has a rear wall 21 and two side walls 26', while its top and front are open. The animal, in order to reach the bait 22, will step upon the end 15 of the tilting platform and tilt the same around pivot pin 16 so that the animal is thrown into the fluid contained in receptacle 10, while the end 15' of the platform, which has been lifted during the tilting of the same by the animal, will return into its normal position of rest as soon as the animal has been thrown off. Post 17 will assist the weight of the platform 15' and press the same back into its normal position aided by spring 23 and by the weight of bar 19 to the front end of which the upper end of post 17 is hinged, so that now the platform 15 is again in position to be stepped upon by another animal attracted by bait 22.

It will be clear that changes may be made in the general arrangement and the construction of the minor details of my invention without deviating from the scope and spirit of the same.

What I claim as new and desire to secure by Letters Patent of the United States is—

An animal trap comprising a fluid container, a cover for said container having an opening, a tilting platform on said cover, one of its parts adapted to freely tilt through said opening under the weight of an animal to throw the same into the fluid in said container, a bait holding housing on said cover, a horizontal bar hingedly secured to the rear wall of said housing, an inclined post having its upper end secured to said bar and engaging with its lower end the other part of said platform, and a spring connecting said bar and said inclined post for limiting its outward movement when said tilting platform is guided into its normal position under the weight of said post and bar after each tilting of an animal into said container to reset the trap.

In testimony whereof I have affixed my signature.

PETER COVIN.